US008631772B2

(12) United States Patent
Gooden et al.

(10) Patent No.: US 8,631,772 B2
(45) Date of Patent: Jan. 21, 2014

(54) TRANSMISSION FLUID WARMING AND COOLING METHOD

(75) Inventors: James Thomas Gooden, Canton, MI (US); Jianping Zhang, Ann Arbor, MI (US); Steven Keith Plumb, Plymouth, MI (US); David Spuller, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 810 days.

(21) Appl. No.: 12/785,118

(22) Filed: May 21, 2010

(65) Prior Publication Data

US 2011/0284200 A1 Nov. 24, 2011

(51) Int. Cl.
*F01P 11/08* (2006.01)

(52) U.S. Cl.
USPC ............. 123/41.31; 123/41.33; 123/196 AB

(58) Field of Classification Search
USPC ............ 123/41.31, 41.33, 196 AB; 180/339; 165/287, 298, 299; 477/98; 475/161
See application file for complete search history.

(56) References Cited

U.S. PATENT DOCUMENTS

| | | | | |
|---|---|---|---|---|
| 3,752,222 A | * | 8/1973 | Olbermann, Jr. ............ | 165/280 |
| 4,680,928 A | | 7/1987 | Nishikawa et al. | |
| 5,352,095 A | * | 10/1994 | Tanaka et al. ............... | 417/12 |
| 5,638,774 A | | 6/1997 | Albertson et al. | |
| 5,992,515 A | | 11/1999 | Spiegel | |
| 6,012,550 A | | 1/2000 | Lee | |
| 6,196,168 B1 | * | 3/2001 | Eckerskorn et al. ....... | 123/41.33 |
| 6,427,640 B1 | * | 8/2002 | Hickey et al. ............... | 123/41.31 |
| 6,520,136 B2 | * | 2/2003 | Ito et al. ................ | 123/142.5 R |
| 6,530,347 B2 | * | 3/2003 | Takahashi et al. ........... | 123/41.1 |
| 6,758,266 B1 | * | 7/2004 | Sjunnesson et al. .......... | 165/299 |
| 6,830,527 B2 | * | 12/2004 | Wakayama .................... | 475/161 |
| 6,871,703 B2 | * | 3/2005 | Kemmerer et al. ........... | 165/297 |
| 7,047,913 B2 | * | 5/2006 | Werner et al. .............. | 123/41.33 |
| 7,073,467 B2 | * | 7/2006 | Kanno et al. ............... | 123/41.33 |
| 7,223,205 B2 | * | 5/2007 | Etchason et al. ................ | 477/98 |
| 7,267,084 B2 | * | 9/2007 | Lutze et al. ................ | 123/41.02 |

(Continued)

FOREIGN PATENT DOCUMENTS

DE 19512783 A1 * 10/1996

OTHER PUBLICATIONS

Semel, "Fuel Economy Improvements Through Improved Automatic Transmission Warm-Up—Stand Alone Oil to Air (OTA) Transmission Cooling Strategy with Thermostatic Cold Flow Bypass Valve", SAE International, 2001-041760, May 2001.

(Continued)

*Primary Examiner* — Noah Kamen
*Assistant Examiner* — Grant Moubry
(74) *Attorney, Agent, or Firm* — Diederiks & Whitelaw, PLC

(57) ABSTRACT

A method for controlling the temperature of transmission fluid in a motor vehicle includes operating in an automatic transmission fluid cooling mode, a heater priority mode entered by disabling automatic transmission fluid heating, and an automatic transmission fluid heating mode which includes sending hot engine coolant to a heat exchanger for heating the automatic transmission fluid by transferring heat from the hot engine coolant to the automatic transmission fluid. The method switches to from a heater priority mode to a transmission heating mode base on a number of sensed conditions including sensed automatic fluid transmission temperature. The method also includes an automatic transmission fluid temperature regulating mode including measuring an automatic transmission fluid temperature and switching between the cooling mode and the heating mode based measured temperature.

22 Claims, 17 Drawing Sheets

(56) References Cited

U.S. PATENT DOCUMENTS

| | | | | |
|---|---|---|---|---|
| 7,360,368 | B2* | 4/2008 | Fickel et al. | 62/50.2 |
| 7,455,618 | B2* | 11/2008 | Chida et al. | 477/98 |
| 7,665,513 | B2* | 2/2010 | Sasaki | 165/298 |
| 8,042,609 | B2* | 10/2011 | Samie et al. | 165/202 |
| 8,116,953 | B2* | 2/2012 | Lopez | 701/54 |
| 2007/0186878 | A1* | 8/2007 | Wantschik | 123/41.29 |
| 2009/0101312 | A1* | 4/2009 | Gooden et al. | 165/104.19 |
| 2010/0197441 | A1* | 8/2010 | Pursifull | 475/161 |
| 2011/0067389 | A1* | 3/2011 | Prior et al. | 60/320 |

OTHER PUBLICATIONS

Semel, "Improved Automatic Transmission Warmup—Stand Alone Oil to Air (OTA) Transmission Cooling Strategy with Thermostatic Cold Flow Bypass Valve", SAE International, 2000-01-0963, Mar. 2000.

* cited by examiner

TRANSMISSION FLUID WARMING AND COOLING METHOD

FIELD OF THE INVENTION

The present invention pertains to the art of reducing parasitic losses in transmissions by warming up transmission fluid present in the transmission in a rapid and efficient manner thereby reducing the transmission fluid's viscosity and cooling the transmission fluid when the transmission is subject to heavy loads.

BACKGROUND OF INVENTION

Motor vehicles are typically used to transport people from place to place. As such they often have a passenger compartment and a power source, such as an engine that drives an automatic transmission which transmits energy from the power source to a set of driven wheels to propel the vehicle. Making such motor vehicles more efficient is currently a main focus of the automobile industry. Unfortunately, most automatic transmissions typically suffer from parasitic losses on startup of the power source. Such losses are particularly acute in the presence of low ambient temperatures, such as those present in a cold start in winter or a cold start in geographic areas having cold climates. Since the automatic transmission fluid present in the transmission has a viscosity that changes based on temperature, in cold temperature the viscosity may be quite high, thereby causing unacceptable parasitic losses and reduced fuel economy at least until the power source warms up the transmission and the automatic transmission fluid. Another problem associated with controlling the temperature of automatic transmission fluid is overheating. When a motor vehicle is subject to heavy use, for example, when the motor vehicle is towing a heavy load, the automatic transmission fluid is often heated too quickly and may overcome inherent cooling present in the transmission and additional cooling systems must be employed.

Also, in order to cool the engine, motor vehicles are typically provided with a cooling system that circulates a liquid coolant through the engine which heats the coolant and cools the engine. The coolant then flows through a heat exchanger or radiator to remove heat from the coolant. The coolant leaving the engine is often used as a heat source for auxiliary tasks. For example, the hot coolant leaving the engine may be sent though a heater core designed to transfer heat from the coolant to air. The hot air is then used to heat the passenger compartment.

To address the problem of reduced fuel economy caused by the transmission fluid being too cold soon after engine start, many motor vehicle manufacturers are pursuing technologies that will help the automatic transmission fluid heat up more quickly. One solution has been to use an oil-to-engine coolant heat exchanger to warm the automatic transmission fluid. However, in past arrangements, additional cooling has been required and therefore the arrangements have not been cost effective. Also, such arrangements have adversely affected passenger compartment heating and even adversely affected coolant flow through associated radiators. Passenger compartment heating can be compromised if too much heat is diverted to heating the automatic transmission fluid and, in the case of a two part radiator with a low temperature loop and a high temperature loop, additional efforts are needed to ensure that engine coolant is always flowing through the low temperature loop when coolant is flowing through the high temperature loop to avoid damage to the radiator.

Another solution is represented by the arrangement shown in U.S. Pat. No. 6,196,168. More specifically, a system is disclosed for preheating transmission fluid wherein part of the engine coolant is quickly heated by an internal combustion engine 17 and made available for heating of the transmission fluid as shown in FIG. 2. Coolant flows through an equalization tank 2 and then through an oil/water heat exchanger 5 but does not flow through radiator 4, 14. However, such an arrangement still suffers from several drawbacks. For example, the arrangement employs an excessive number of parts, which form a complex system that is slow to respond to changes in temperature. Another attempt to preheat transmission fluid is represented by U.S. Pat. No. 7,267,084. As shown in FIG. 2, engine coolant is sent through heat exchanger/oil cooler 24 to heat transmission fluid, however the system is not designed to send only hot or cold coolant to heat exchanger/oil cooler 24 the but rather sends a mixture of the hot and cold coolant. Furthermore, in order to function properly, the arrangement in FIG. 2 requires a relatively large number of control valves and heat exchangers yielding a relatively complicated and expensive system.

Based on the above, there exists a need in the art for a system for heating and cooling automatic transmission fluid in a rapid and efficient manner thereby reducing the viscosity of the transmission fluid and for cooling the transmission fluid when the transmission is subject to heavy loads, while overcoming some or all of the above-mentioned shortcomings of the prior art.

SUMMARY OF THE INVENTION

The present invention is directed to a method for controlling the temperature of transmission fluid in a motor vehicle having a radiator and an automatic transmission fluid heat exchanger. In a first embodiment, the method first includes entering a heater priority mode by having an engine thermostat prevent hot engine coolant from reaching the radiator or heat exchanger when the engine is cold. In other embodiments, a cooling mode is, optionally and briefly, entered by sending cold engine coolant to a heat exchanger for cooling the automatic transmission fluid by transferring heat from the automatic transmission fluid to the cold engine just prior to entering the heater priority mode. Additionally, the heater priority mode in the other embodiments is entered by disabling automatic transmission fluid heating using two valves that operate independently of the thermostat.

In any case, the method next enters a heating mode by transferring heat from hot engine coolant to the automatic transmission fluid only when it is determined that at least one of the four following conditions is met. A first condition is met by determining if the measured engine coolant temperature is above a coolant temperature set point. A second condition is met by measuring an automatic transmission fluid temperature in the automatic transmission and determining if the measured transmission fluid temperature is above a fluid temperature set point. A third condition is met by determining if a first timer has expired. The first timer is set when a rate of change of the engine coolant temperature exceeds a rate threshold. The first timer is set to: a high timer value if the engine coolant temperature is below a low temperature set point; a variable timer value if the engine coolant temperature is between the low temperature set point and a high temperature set point; and a low timer value if the engine coolant temperature is above the high temperature set point. A fourth condition is met by determining if a second timer has expired. The second timer is set if the transmission control lever is not in the park position at which point the second timer is set to within a high variable time range if the engine coolant temperature is in a low variable temperature range; an intermediate variable time range if the engine coolant temperature is in an intermediate variable temperature range; and a low timer set point if the engine coolant temperature is above a high value temperature set point.

The method then enters an automatic transmission fluid temperature regulating mode which includes measuring the temperature of the automatic transmission fluid and switching between the cooling mode and the heating mode based on the measured temperature. More specifically, the regulating mode includes measuring a sump temperature of the automatic transmission fluid and measuring a case exit temperature of the automatic transmission fluid as the fluid leaves the transmission. The cooling mode is entered when either the transmission sump temperature exceeds a first high set value or the temperature at the transmission case exit exceeds a second high set value. The heating mode is entered when both the sump temperature drops below a first low set value and the case out temperature drops below a second low set value.

Each of the preferred embodiments provides a method for heating and cooling automatic transmission fluid in a rapid and efficient manner, thereby reducing the viscosity of the transmission fluid and for cooling the transmission fluid when the transmission is subjected to heavy loads. Additional objects, features and advantages of the present invention will become more readily apparent from the following detailed description of preferred embodiments when taken in conjunction with the drawings wherein like reference numerals refer to corresponding parts in the several views.

DESCRIPTION OF PREFERRED EMBODIMENTS

Figure 1:
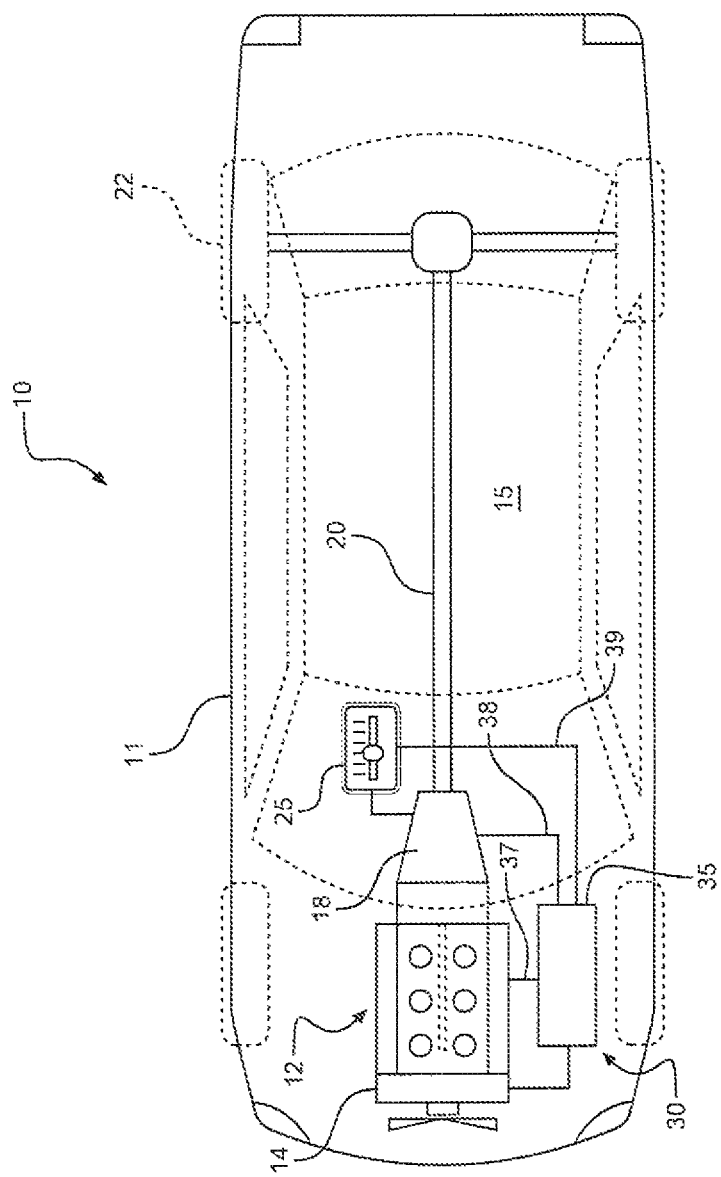
FIG. 1 is a diagram showing a vehicle incorporating a system for heating and cooling automatic transmission fluid in accordance with the invention.

With initial reference to FIG. 1, there is shown an automotive vehicle 10 having a body 11 and an internal combustion engine 12 with a radiator 14. Within body 11 there is located a passenger compartment 15 that is heated by heat transferred from engine 12 as discussed more fully below. Power from engine 12 is transmitted to a transmission 18, then to the other portions of a powertrain 20 and eventually to drive wheels 22. Transmission 18 may be shifted between park, drive and reverse settings by a control lever 25. Vehicle 10 is shown as a rear wheel drive vehicle but any type of powertrain arrangement, including front wheel, all wheel drive and hybrid systems, could be employed. A system 30 for controlling heating or cooling automatic transmission fluid flowing through transmission 18 includes a controller 35 connected to engine 12, transmission 18, and shift lever 25 by communication lines 37, 38 and 39 respectively. In accordance with the invention, system 30 functions by warming up transmission fluid present in transmission 18 in a rapid and efficient manner, thereby reducing the viscosity of the transmission fluid and cooling the transmission fluid when transmission 18 is subjected to heavy loads as more fully discussed below.

Figure 2:
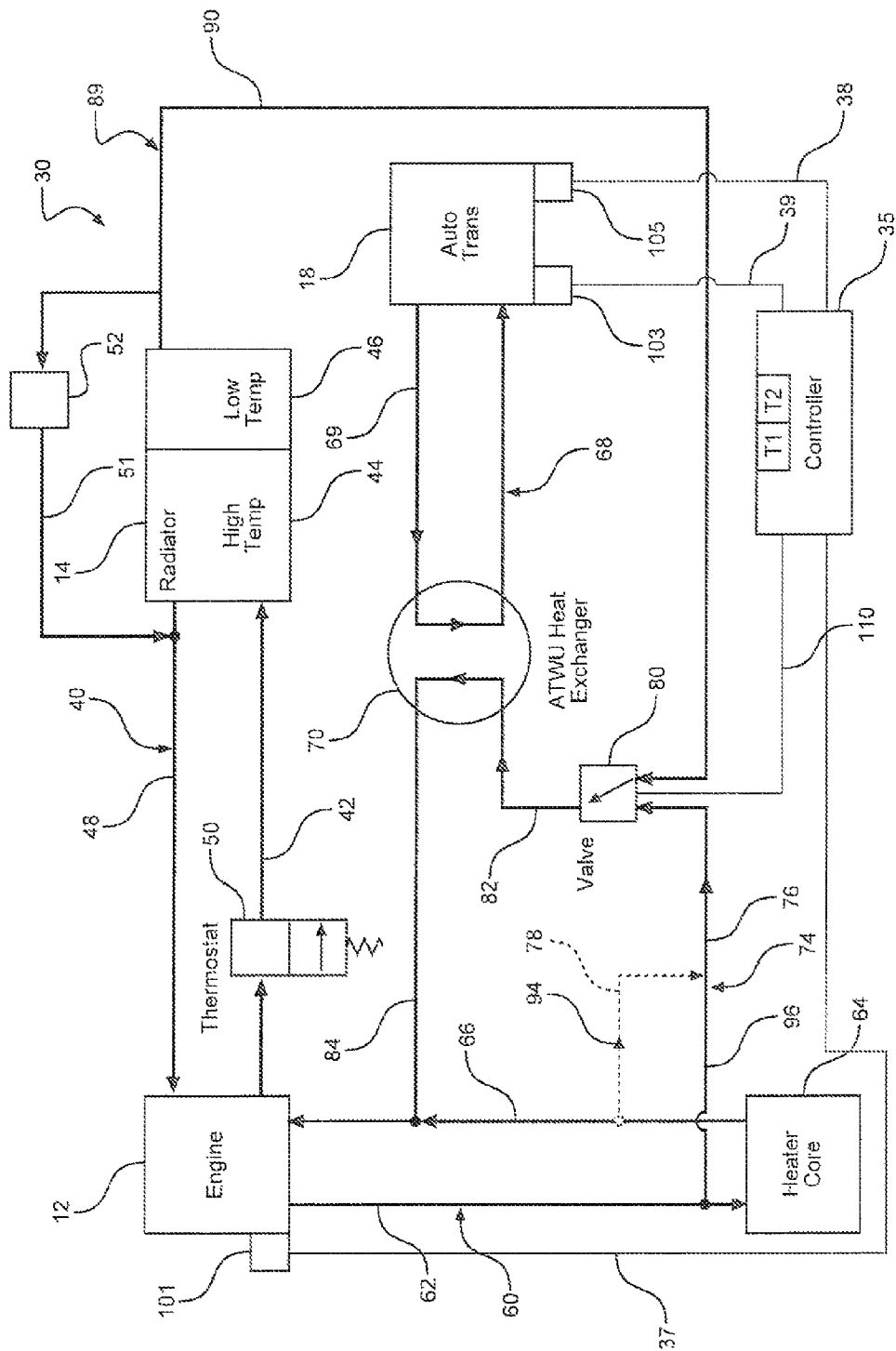
FIG. 2 is a schematic diagram of a first preferred embodiment of the system in FIG. 1 in a heater priority mode using a single valve and an engine thermostat.

Referring to FIG. 2, there is shown a schematic diagram of a first preferred embodiment of system 30 in a heater priority mode. An engine cooling circuit 40 is shown having a hot coolant line 42 extending from engine 12 to radiator 14. Engine 12 is a conventional internal combustion engine having an engine block containing the usual coolant passages arranged to allow engine coolant to absorb heat generated by the operation of engine 12. The hot engine coolant is pumped through hot coolant line 42 to radiator 14. Radiator 14 is preferably designed to have a high temperature section 44 and a low temperature section 46. Radiator 14 is designed to carry heat away from the hot engine coolant and transfer the heat to ambient air flowing over radiator 14 and allow the cooled engine coolant to return to engine 12 through cold engine coolant line 48 thus completing engine cooling circuit 40. Engine cooling circuit 40 is selectively opened or closed to engine coolant flow by a thermostat 50, preferably located between radiator 14 and engine 12 in hot coolant line 42. Thermostat 50 closes off cooling circuit 40 upon engine startup when engine 12 is cold. Thermostat 50 opens up cooling circuit 40 when engine 12 becomes hot enough to need cooling and thus regulates the engine temperature. A return line 51 is provided with a flow restrictor device 52 or relief valve located either internally or externally to radiator 14. Return line 51 assures proper flow through radiator 14 so that both high temperature section 44 and low temperature section 46 receive coolant flow simultaneously.

A passenger compartment heating circuit 60 is shown as starting at engine 12, extending through heater core supply line 62 to a heater core 64 and then back to engine 12 through a heater core return line 66. Engine coolant always flows through heating circuit 60 when engine 12 is running, however the amount of heat carried by the engine coolant may vary as described more fully below. Regardless, excess heat from engine 12 is transferred to hot engine coolant that passes through heater core supply line 62 to heater core 64. In heater core 64, heat is then transferred from the hot engine coolant to air that is used to heat passenger compartment 15. An automatic transmission temperature regulation circuit 68 includes a transmission temperature regulation fluid line 69 that guides transmission fluid from transmission 18 to a heat exchanger 70 and back to transmission 18. Heat exchanger 70 preferably transmits heat either to or from the transmission fluid flowing through temperature regulation circuit 68 in a manner discussed in more detail below.

A transmission preheating circuit 74 receives hot engine coolant from passenger compartment heating circuit 60. Preferably, transmission preheating circuit 74 connects to supply line 62 of heating circuit 60 just up stream of heater core 64 through a main preheating supply line 76. Alternatively, transmission preheating circuit 74 receives hot engine coolant from heater core return line 66 through an optional preheating supply line 78, which connects to main preheating supply line 76. In either case, preheating supply line 76 is connected to a first valve 80 which in turn is connected to a shunt line 82 extending between first valve 80 and heat exchanger 70. Preheating circuit 74 also includes a preheating return line 84 for returning engine coolant to passenger compartment heating circuit 60. A transmission cooling circuit 89 includes a cold engine coolant supply line 90 that extends from radiator 14 to first valve 80. Cooling circuit 89 provides relatively cool engine coolant to first valve 80.

Figure 3:
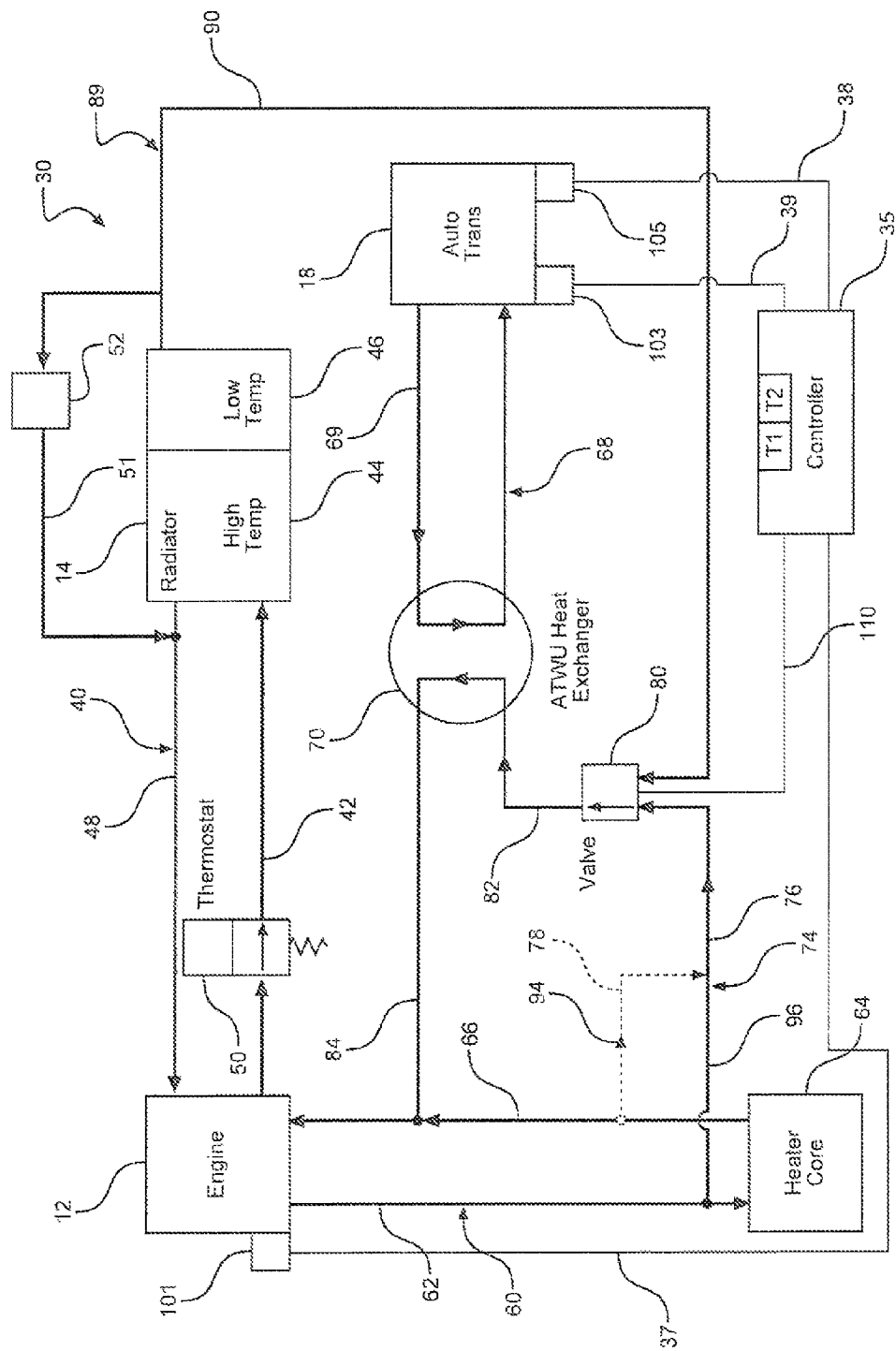
FIG. 3 is a schematic diagram of the first preferred embodiment of the system in FIG. 2 in an automatic transmission fluid heating mode.

In FIG. 2, system 30 is shown in a heater priority mode. Since thermostat 50 also will prevent coolant flow to first valve 80 when engine 12 is cold, no coolant travels from radiator 14 to exchanger 70 even though first valve 80 is positioned to allow such flow. The heater priority mode only lasts a short time until engine 12 warms up and then thermostat 50 will switch positions to that shown in FIGS. 3 and 4. In FIG. 3, first valve 80 is positioned to allow a flow 94 of hot engine coolant through optional supply line 78 or a flow 96 of hot engine coolant through supply line 76 to heat exchanger 70 thus placing system 30 in an automatic transmission fluid heating mode. Heat from engine 12 is transferred in engine 12 to hot engine coolant flow 96 that flows through supply line 62 and then preheating supply line 76 to first valve 80 and shunt line 82. The heat then transfers from the hot engine coolant to the relatively cool automatic transmission fluid. The heat then travels through transmission temperature regulation circuit 68 to preheat the transmission fluid in transmission 18 when system 30 is operating in cold ambient temperatures. By contrast, in FIG. 4, system 30 is shown in an automatic transmission fluid-cooling mode. In the fluid-cooling mode, first valve 80 is positioned to allow a flow 97 of relatively cool engine coolant through engine coolant supply line 90 to first valve 80. The cool engine coolant travels through shunt line 82 to heat exchanger 70 and functions to cool the automatic transmission fluid flowing through temperature regulation circuit 68.

Controller 35 is connected several temperature sensors in order to determine a starting temperature that is indicative of the temperature of the automatic transmission fluid when engine 12 is started. For example, controller 35 is connected to a temperature sensor 101 through communication line 37 to allow controller 35 to read the temperature of engine 12 or the engine coolant in engine 12. Controller 35 is also connected to temperature sensors 103 and 105 through communication line 38 and 39 so that controller 35 is allowed to read the temperature of the transmission fluid in the sump or a transmission case exit. Alternatively, the case exit temperature is inferred from the sump fluid temperature and other signals available to controller 35. Additionally, ambient temperature is measured from any location such as the air intake to engine 12 or the air flowing in passenger compartment 15. Preferably, any one of these temperatures, or other measured temperatures indicative of the automatic transmission fluid when engine 12 is started, constitute the starting temperature. Controller 35 also includes a first timer T1 and a second timer T2. With this configuration, controller 35 is able to control the position of valve 80 through control line 110 depending on the sensed temperatures and based on certain timing to switch system 30 between the automatic transmission heating mode of FIG. 2 and the automatic transmission cooling mode of FIG. 3 as discussed more fully with respect to FIG. 10.

Figure 5:
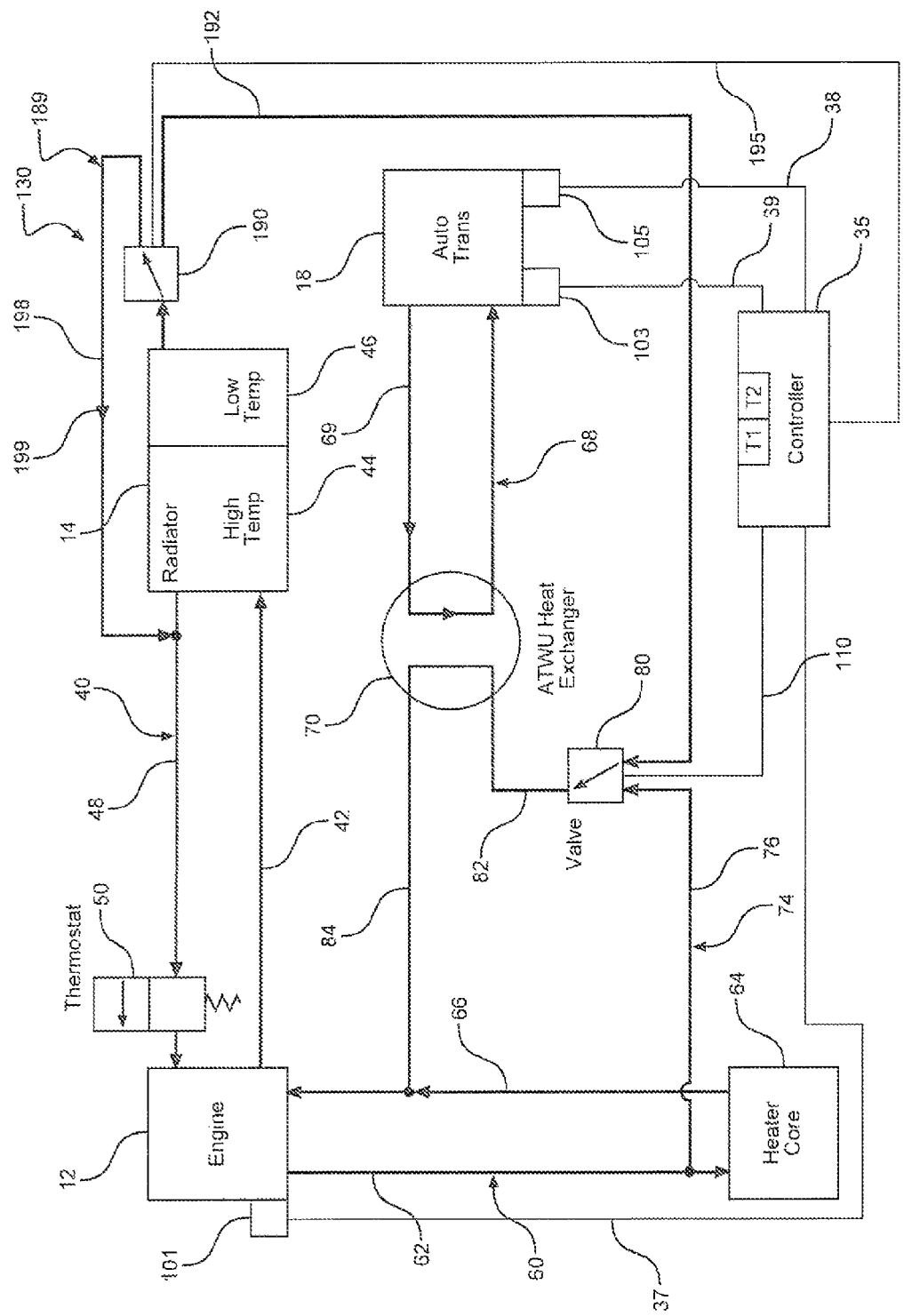
FIG. 5 is a schematic diagram of a second preferred embodiment of the system in FIG. 1 in a heater priority mode independent of the engine thermostat using two valves.
Figure 6:
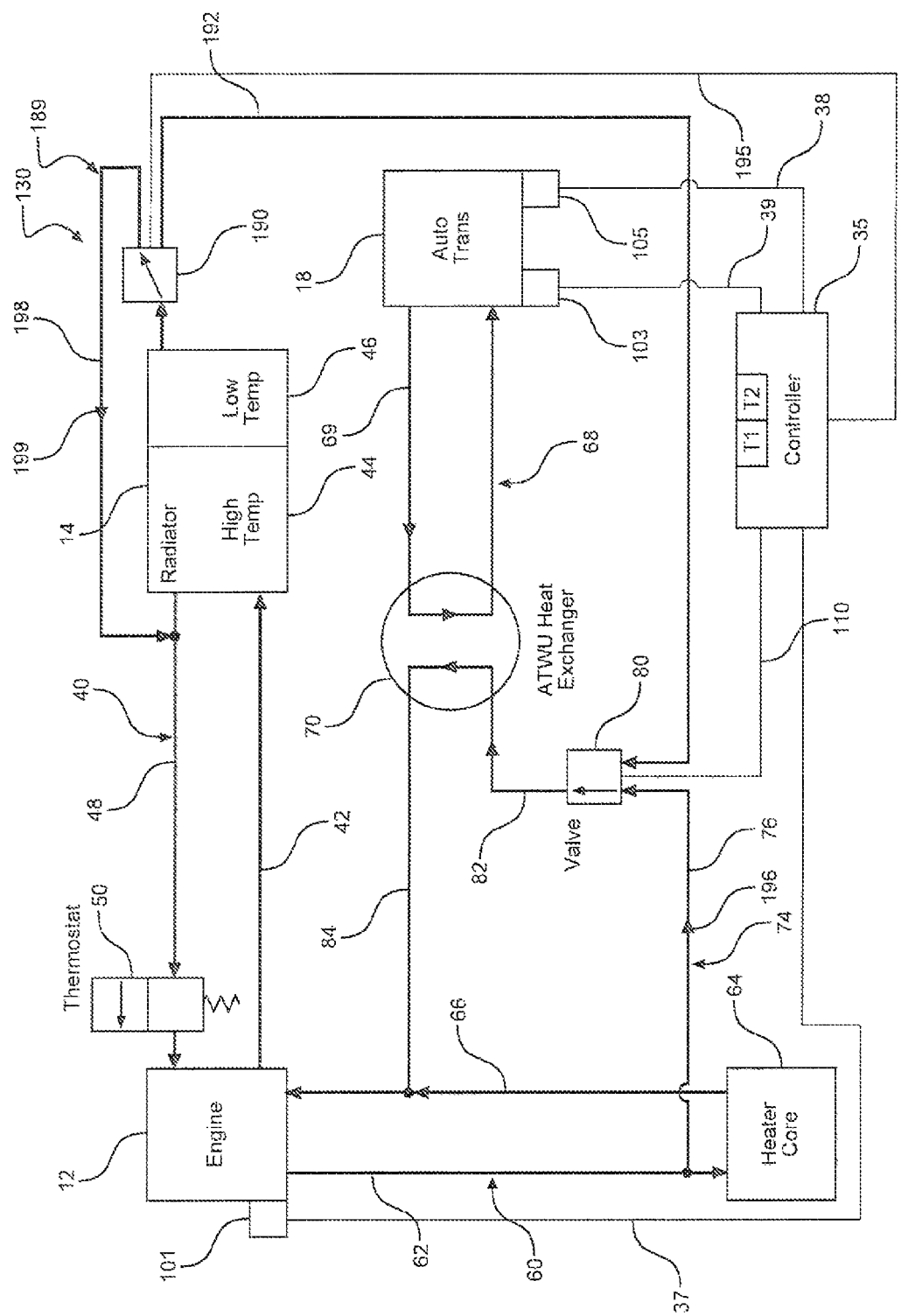
FIG. 6 is a schematic diagram of the second preferred embodiment of the system of FIG. 5 in an automatic transmission fluid heating mode.
Figure 7:
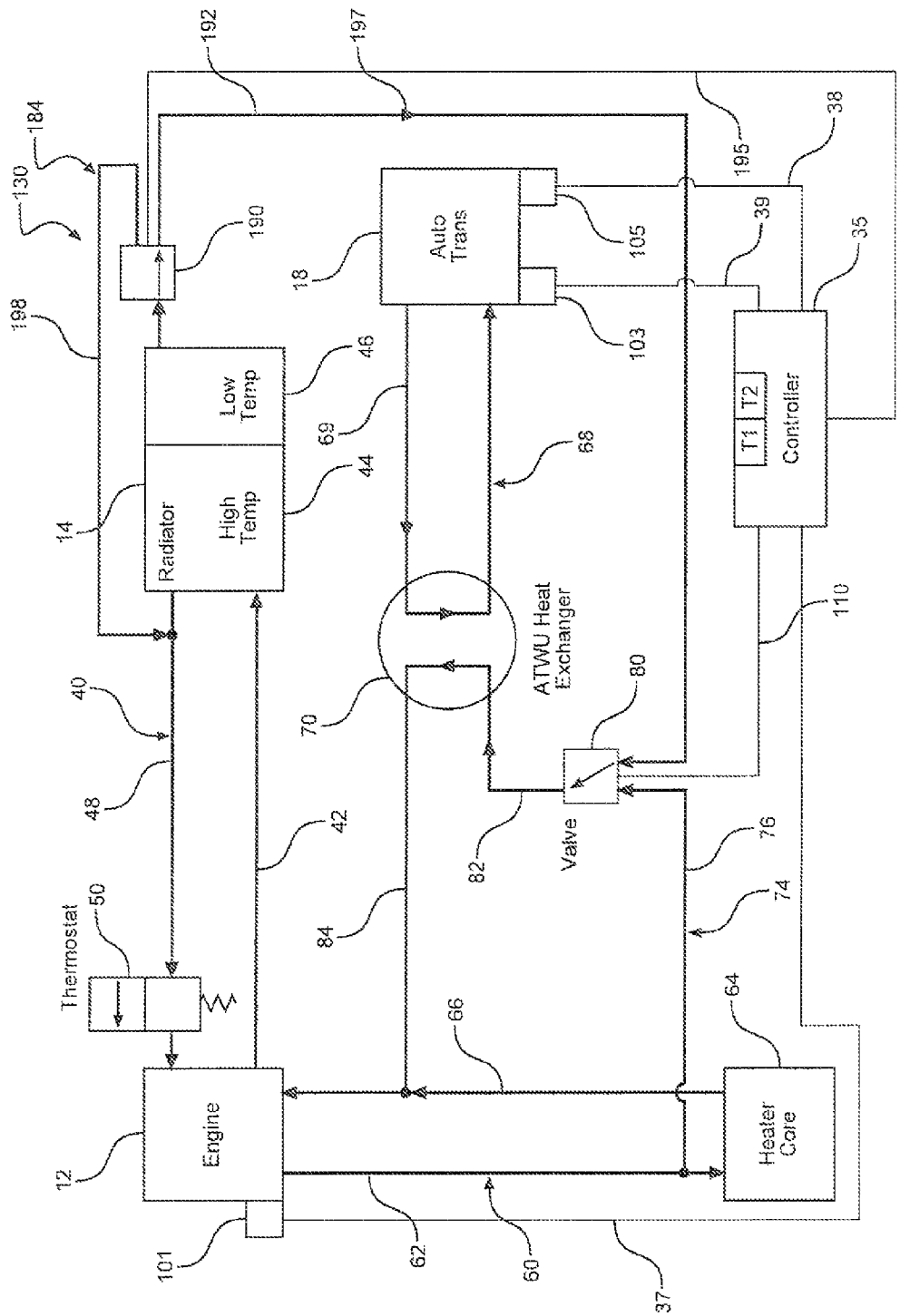
FIG. 7 is a schematic diagram of the second preferred embodiment of the system in FIG. 5 in an automatic transmission fluid cooling mode.

Turning to FIGS. 5-7, there is shown a second preferred embodiment of the invention. Most of the parts of the second preferred embodiment are the same as the first preferred embodiment and like reference numerals are used for like parts. Only the differences between the two embodiments will be discussed here. In the second preferred embodiment, a system 130 has a transmission cooling circuit 189 with a second valve 190 not found in the first preferred embodiment. Second valve 190 is connected to an engine coolant supply line 192. Second valve 190 is controlled by controller 35 through communication line 195 and is adapted to switch flow between a cold-coolant return conduit 198 and coolant line 192. Second valve 190 is positioned to selectively send cold engine coolant flow 199 back to engine 12 as in FIGS. 5 and 6, or to send cold engine coolant to valve 80 as in FIG. 7 to place system 130 in a transmission cooling mode. When second valve 190 sends fluid back to engine 12, system 130 is placed in a heater priority mode when valve 80 is in a position as shown in FIG. 5, or an automatic transmission fluid heating mode when valve 80 is in a position as shown in FIG. 6. In the heater priority mode, system 130 does not provide any flow through heat exchanger 70. In the transmission heating mode, a flow 196 of hot engine coolant is sent to heat exchanger 70 from engine 12 and in the automatic transmission fluid cooling mode, a flow 197 of cold engine coolant is sent to heat exchanger 70 from radiator 14. In the second embodiment, thermostat 50 is preferably located in coolant line 48 and does not affect switching system 130 between modes.

Figure 8:
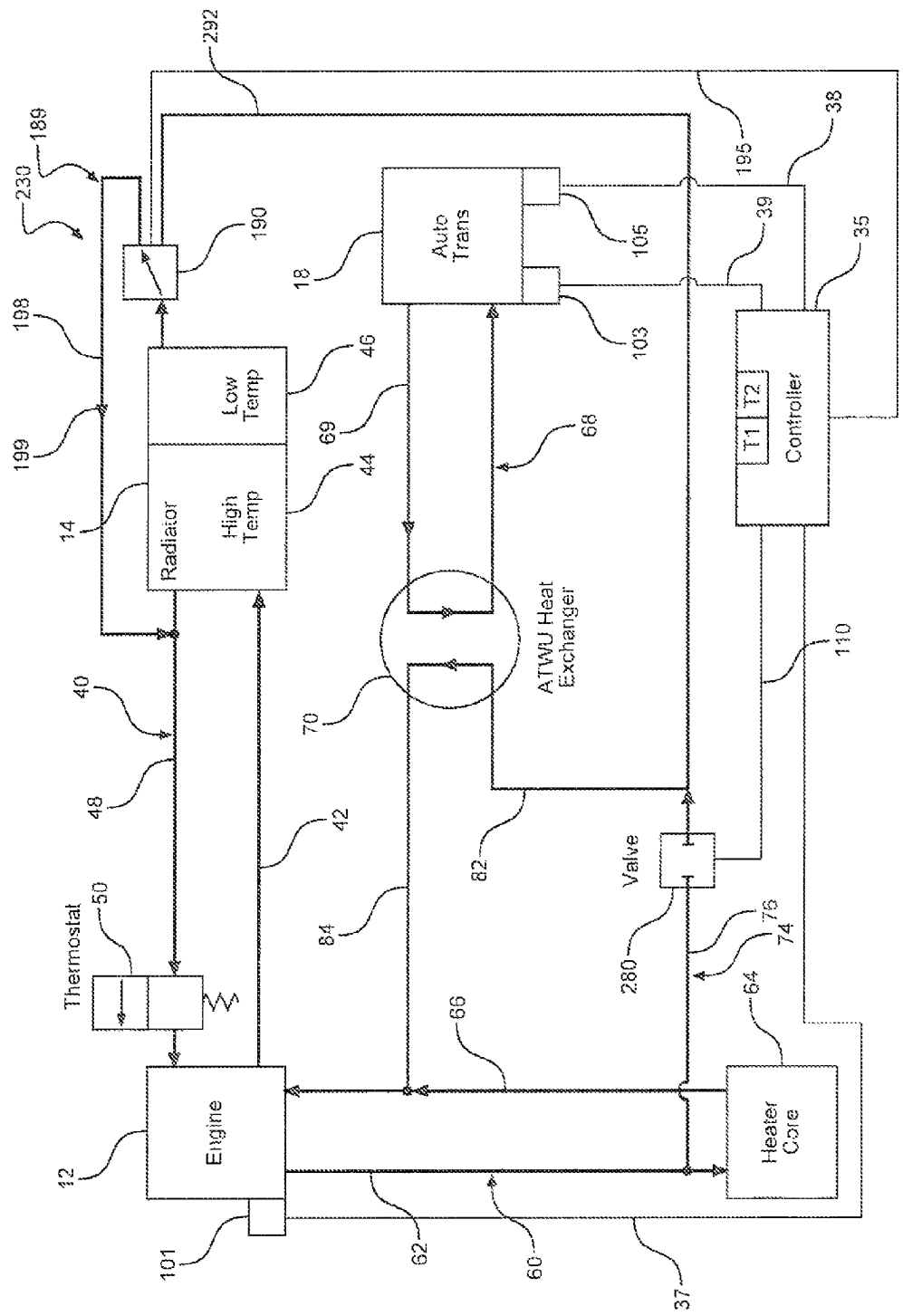
FIG. 8 is a schematic diagram of a third preferred embodiment of the system in FIG. 1 in a heater priority mode using two valves.
Figure 9:
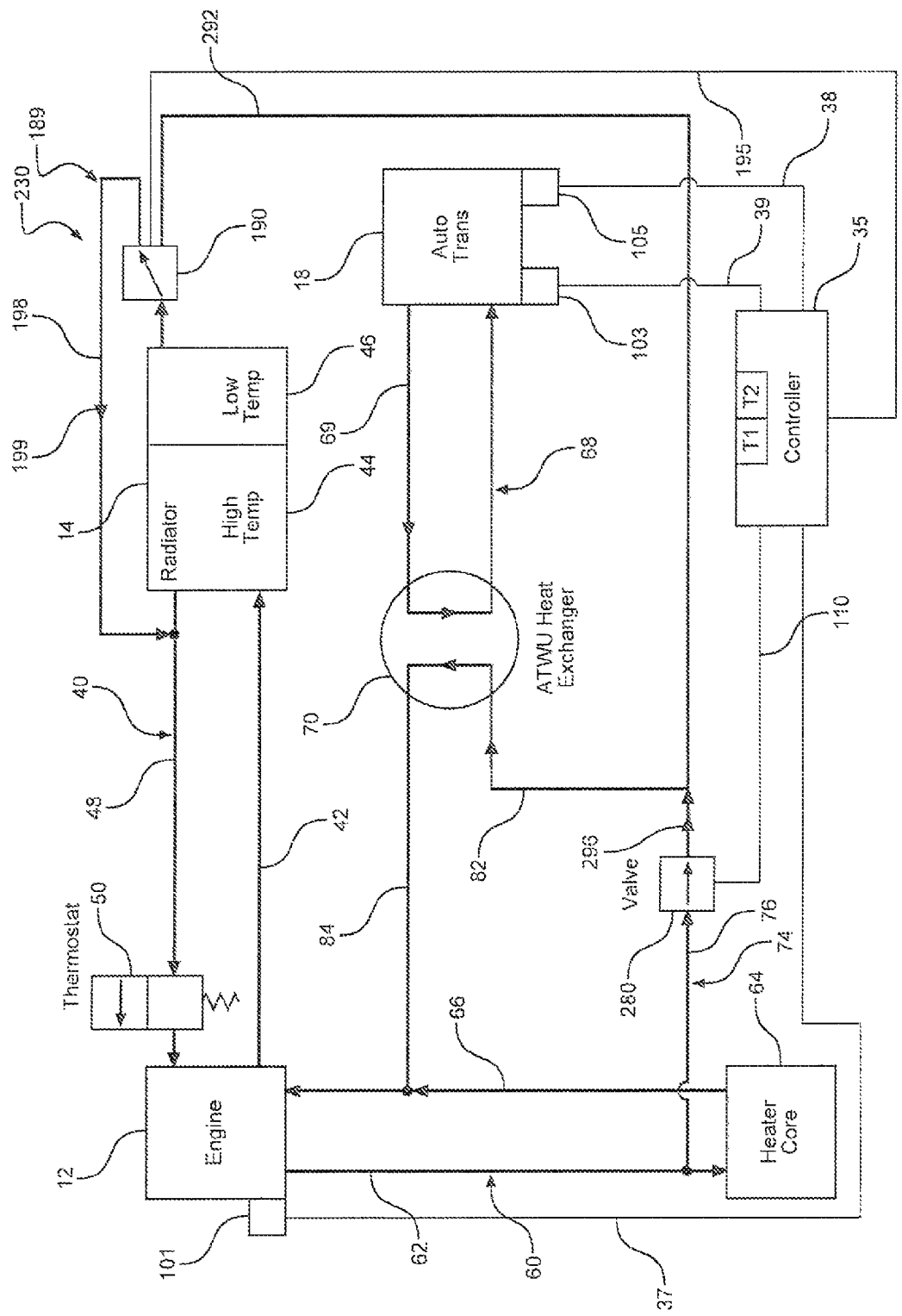
FIG. 9 is a schematic diagram of the third preferred embodiment of the system of FIG. 8 in an automatic transmission fluid heating mode.
Figure 10:
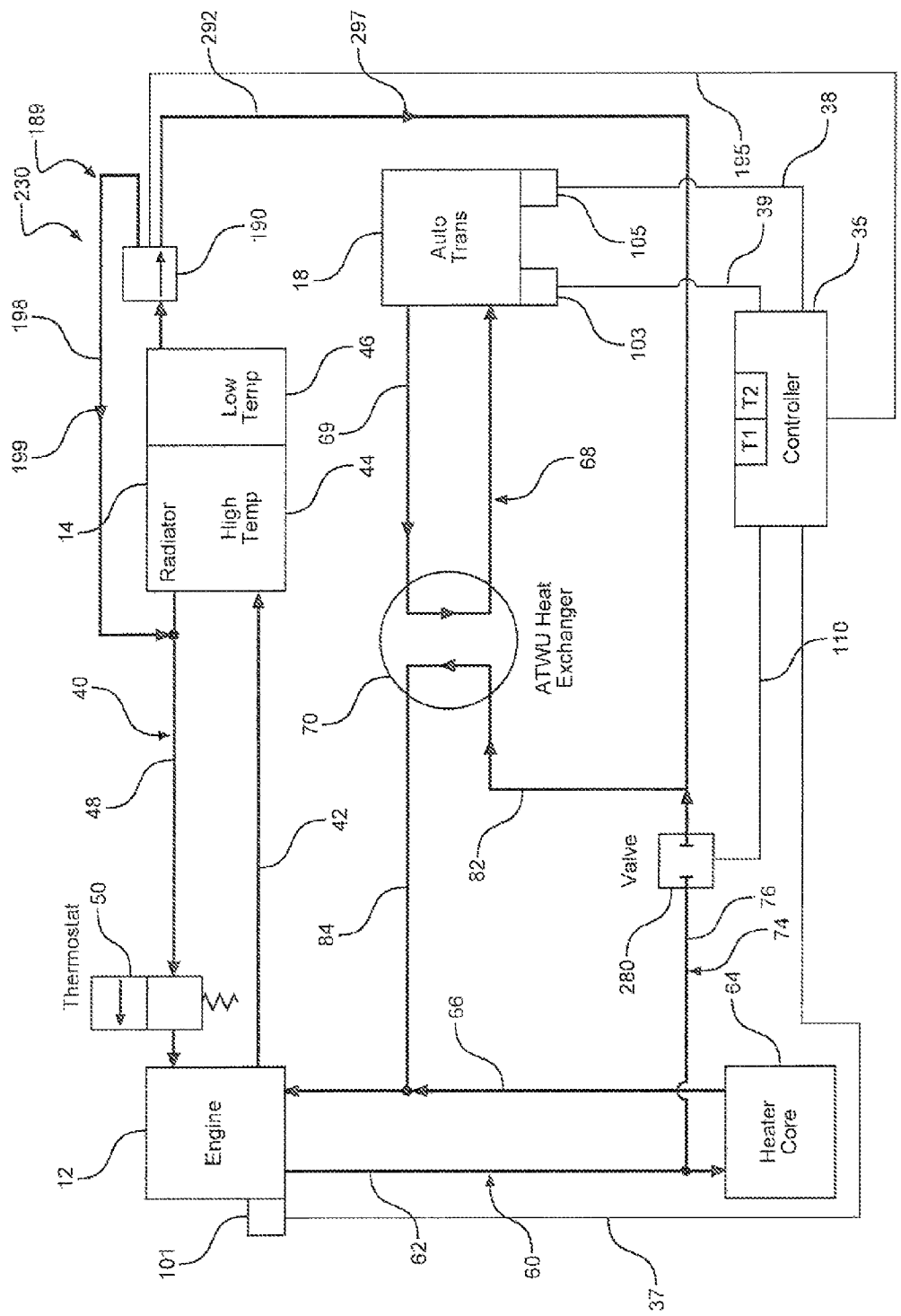
FIG. 10 is a schematic diagram of the third preferred embodiment of the system in FIG. 8 in an automatic transmission fluid cooling mode.

Turning now to FIGS. 8-10, there is shown a third preferred embodiment of the invention. Most of the parts of the third preferred embodiment are the same as the second preferred embodiment and like reference numerals are used for like parts. Only the differences between the two embodiments will be discussed here. Specifically, valve 80 of the second preferred embodiment which receives flow from both line 76 and line 192, has been replaced with a valve 280 that only receives coolant flow from line 76. Line 192 has been replaced with line 292 that directly connects second valve 190 to line 82. In FIG. 8, system 230 is in a heater priority mode with no coolant flowing through heat exchanger 70 because first valve 280 is closed preventing the flow of hot engine coolant from engine 12 through line 76, while valve 190 is set to return cold engine coolant back to engine 12 and prevents cold engine coolant from reaching heat exchanger 70. In FIG. 9, system 230 is in an automatic transmission fluid heating mode with a hot engine coolant flow passing through heat exchanger 70 because first valve 280 is open allowing the flow of hot engine coolant from engine 12 through line 76, while valve 190 is set to return cold engine coolant back to engine 12 and prevents cold engine coolant from reaching heat exchanger 70. In FIG. 10, system 230 is in an automatic transmission fluid cooling mode with a cold engine coolant flow passing through heat exchanger 70 because first valve 280 is closed preventing the flow of hot engine coolant from engine 12 through line 76, while valve 190 is set to supply cold engine coolant to heat exchanger 70 through line 292.

Figure 11:
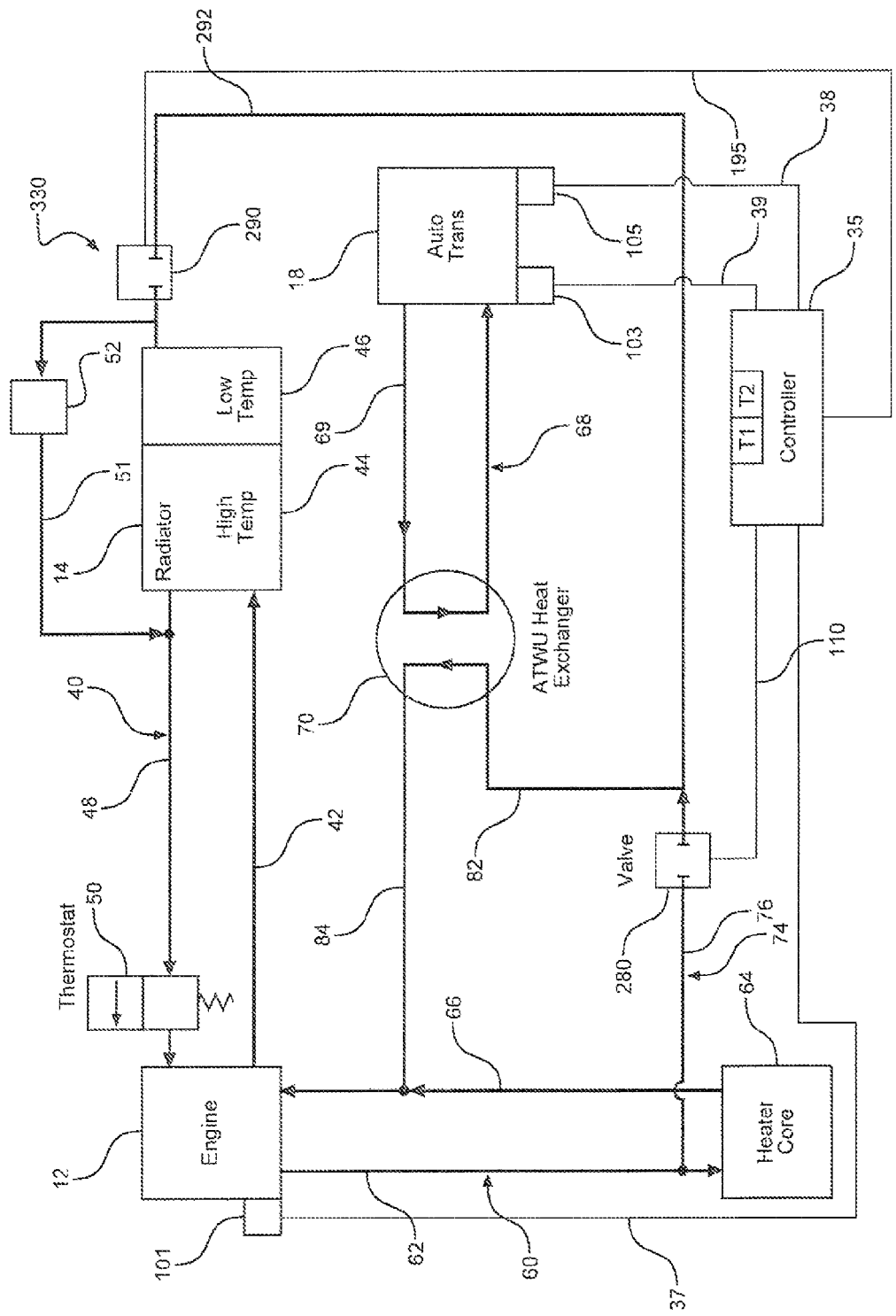
FIG. 11 is a schematic diagram of a fourth preferred embodiment of the system in FIG. 1 in a heater priority mode using two valves.
Figure 12:
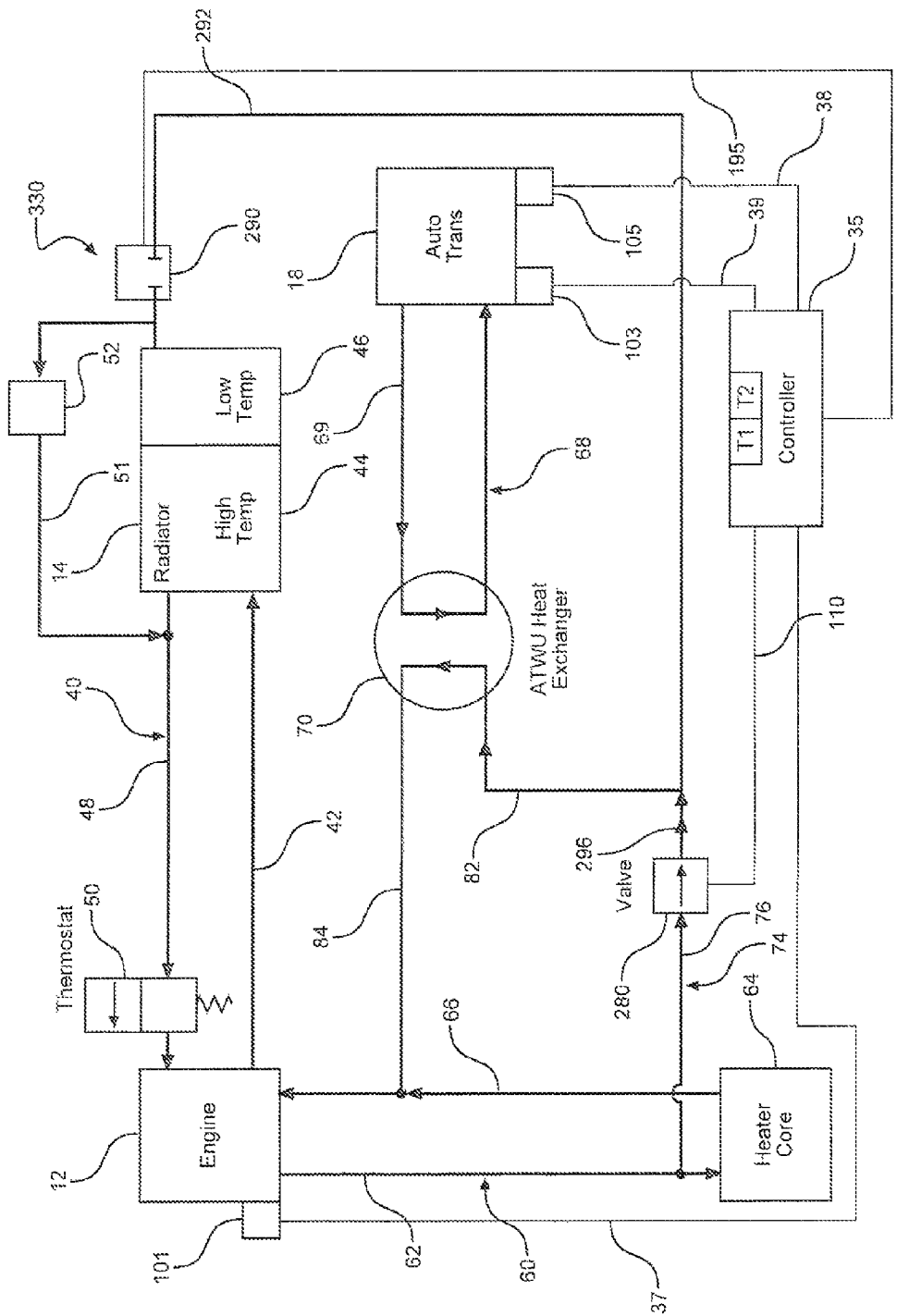
FIG. 12 is a schematic diagram of the fourth preferred embodiment of the system of FIG. 11 in an automatic transmission fluid heating mode.
Figure 13:
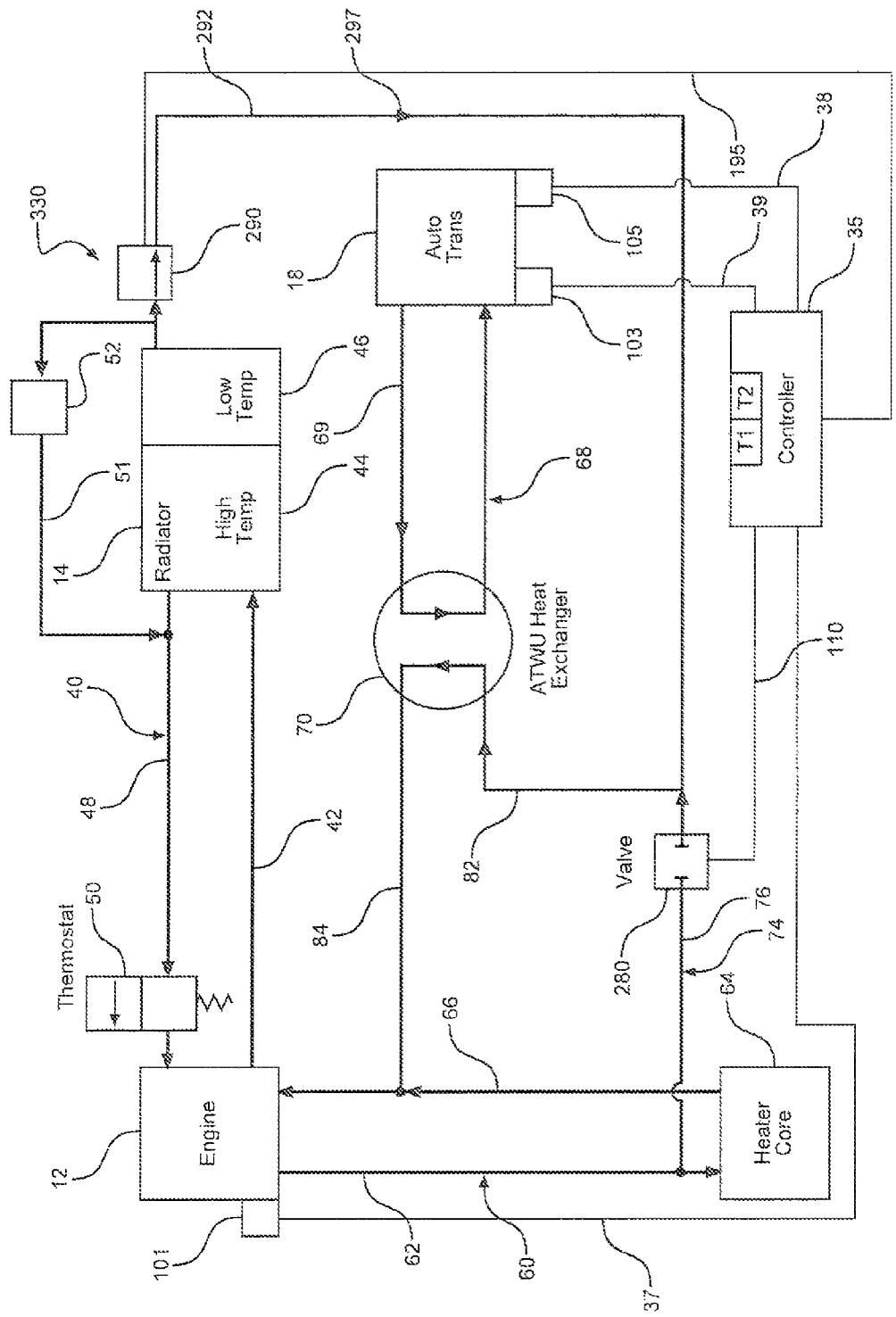
FIG. 13 is a schematic diagram of the fourth preferred embodiment of the system in FIG. 11 in an automatic transmission fluid cooling mode.

Turning now to FIGS. 11-13, there is shown a fourth preferred embodiment of the invention. Most of the parts of the fourth preferred embodiment are the same as the third preferred embodiment and like reference numerals are used for like parts. Only the differences between the two embodiments will be discussed here. Specifically, valve 190 of the third preferred embodiment has been replaced with valve 290 which is set to either allow or not allow flow from radiator 14 to heat exchanger 70. Additionally, return conduit 198 is not used but rather return line 51 and restriction device 52 from the first embodiment are used. Valves 280 and 290 are closed in FIG. 11 thus placing a system 330 into a heater priority mode. In FIG. 12, system 330 is in an automatic transmission fluid heating mode with a hot engine coolant flow passing through heat exchanger 70 because first valve 280 is open allowing the flow of hot engine coolant from engine 12 through line 76, while valve 290 is set to return cold engine coolant back to engine 12 and prevents cold engine coolant from reaching heat exchanger 70. In FIG. 13, system 330 is in an automatic transmission fluid cooling mode with a cold engine coolant flow passing through heat exchanger 70 because first valve 280 is closed preventing the flow of hot engine coolant from engine 12 through line 76, while valve 290 is set to supply cold engine coolant to heat exchanger 70 through line 292.

Figure 4:
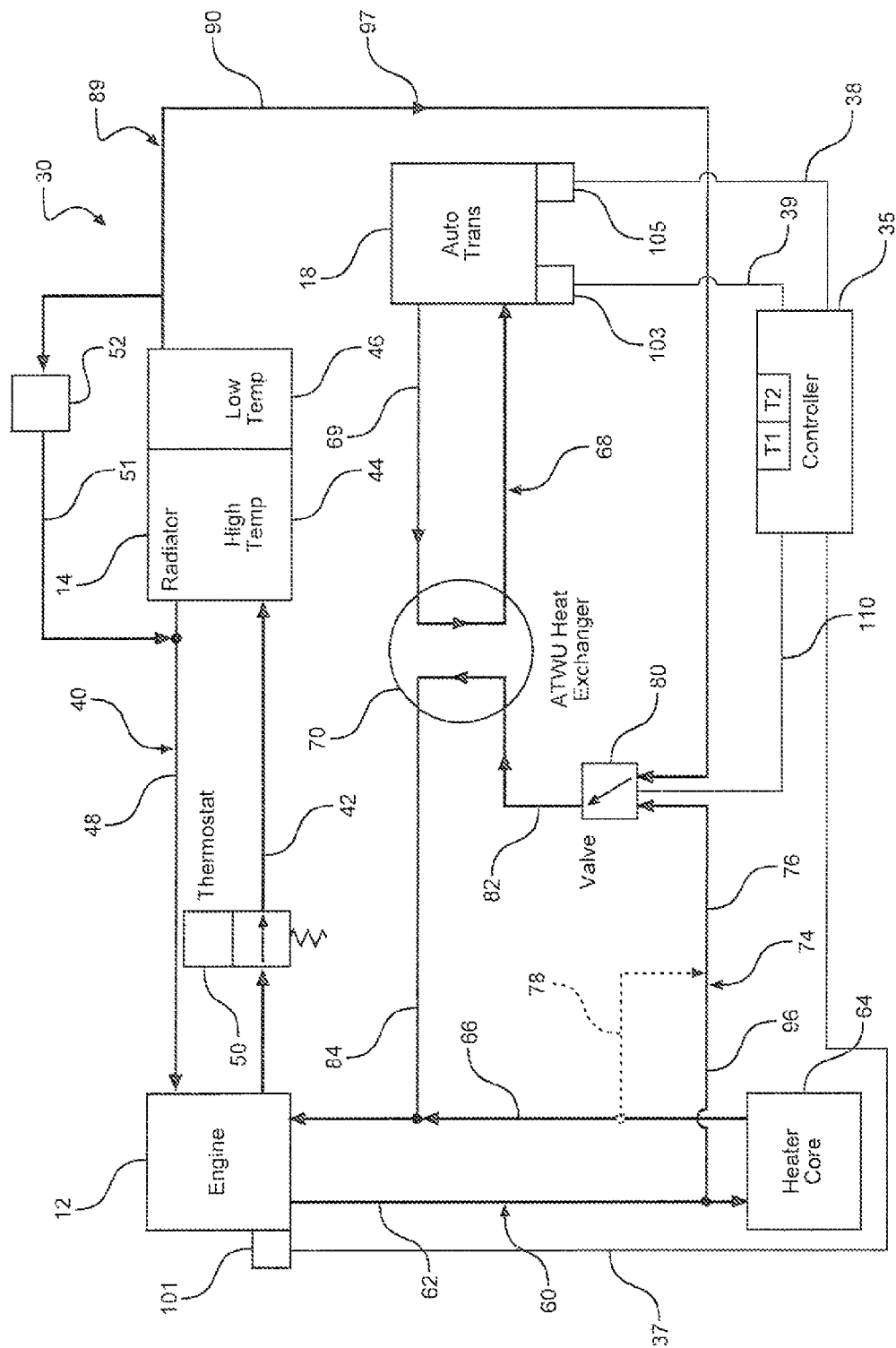
FIG. 4 is a schematic diagram of the first preferred embodiment of the system of FIG. 2 in an automatic transmission fluid cooling mode.
Figure 14:
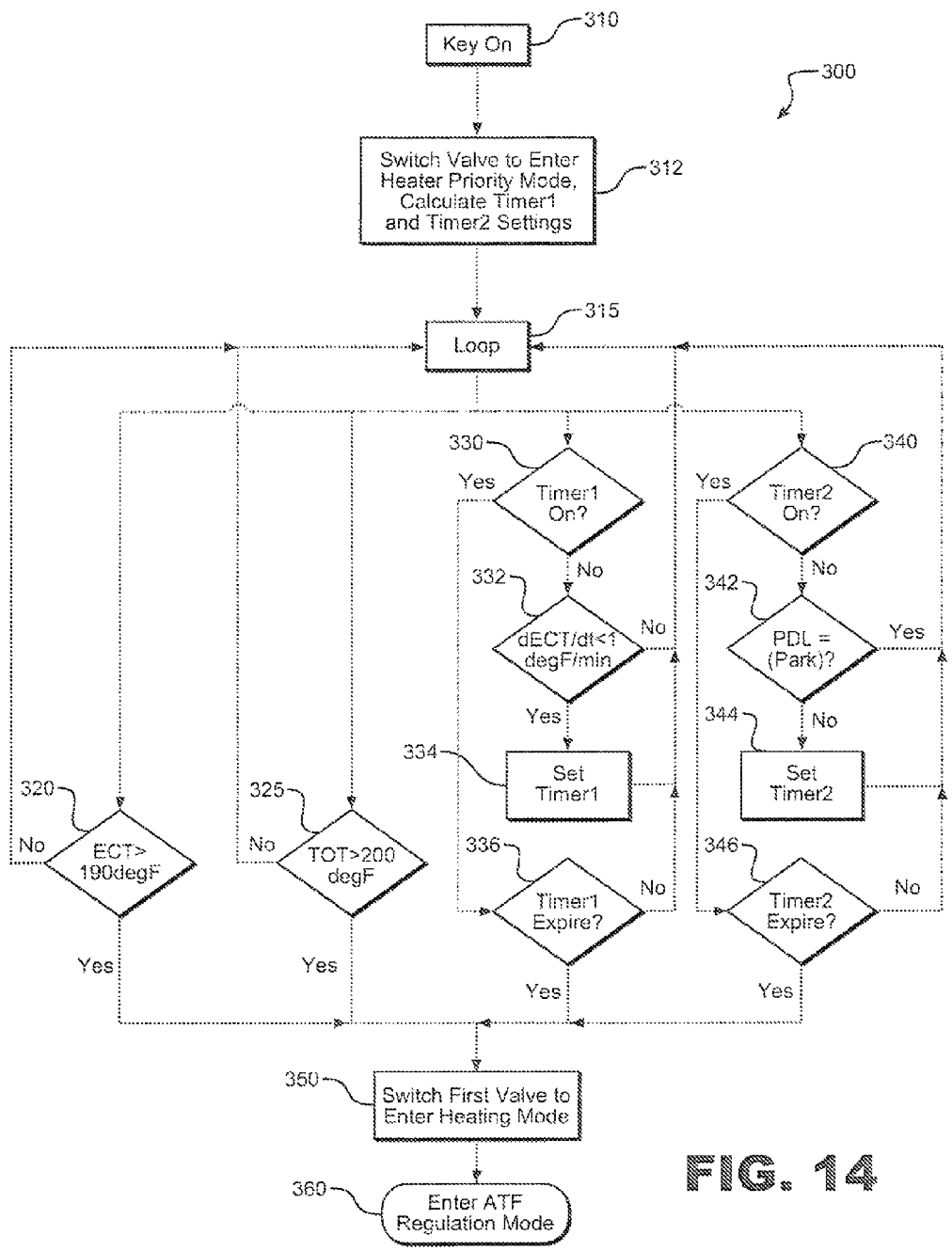
FIG. 14 is a flowchart showing a control routine employed in the system of FIG. 2 according to the first preferred embodiment of the invention.
Figure 15:
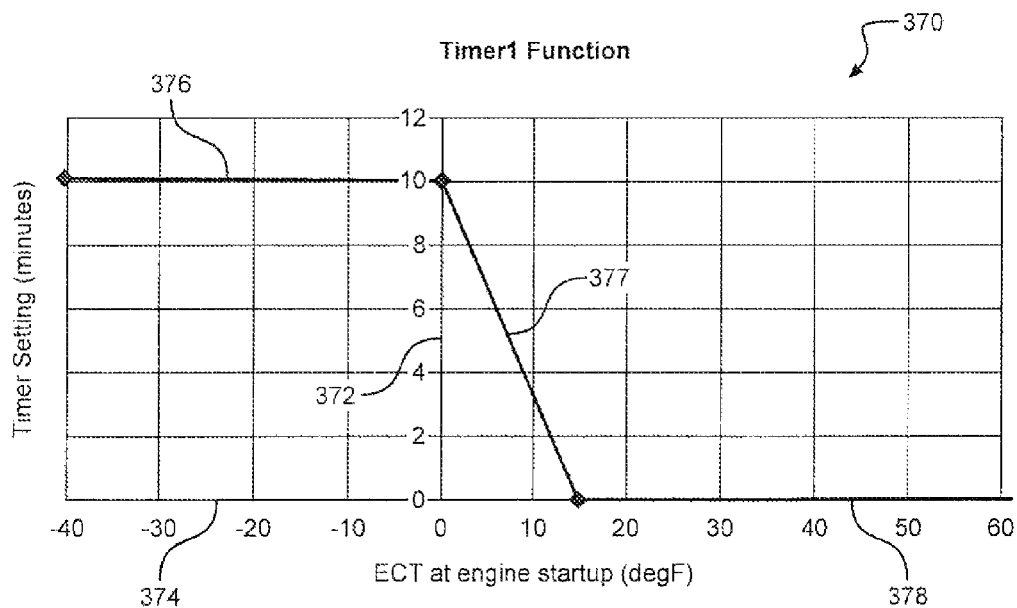
FIG. 15 is a graph showing a first timer setting versus engine coolant temperature at start-up in accordance with the invention.
Figure 16:
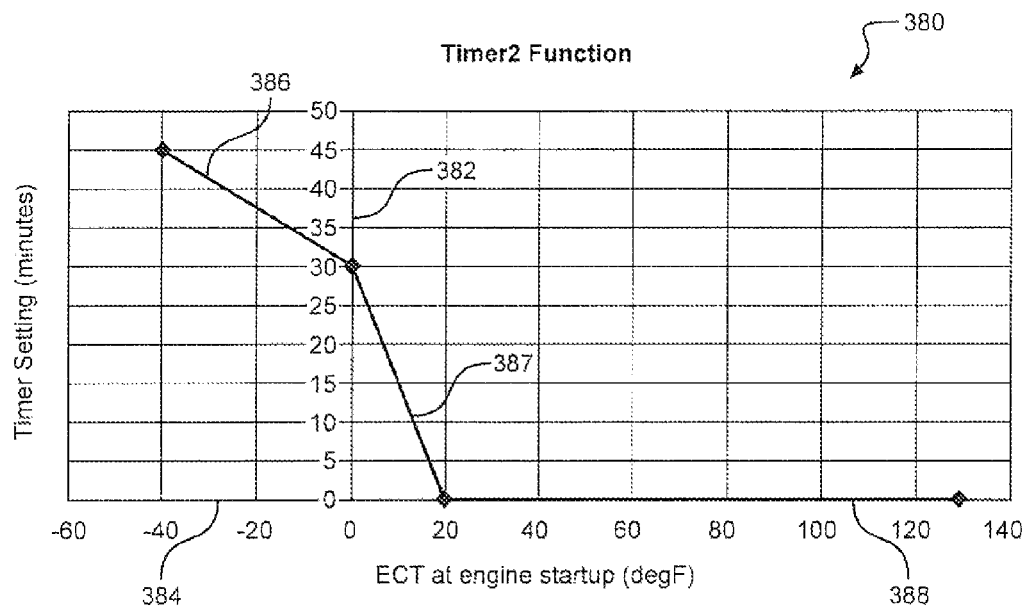
FIG. 16 is a graph showing a second timer setting versus engine coolant temperature at start-up in accordance with the invention.

FIG. 14 is a flowchart showing a control routine 300 employed in system 30 of FIGS. 2-4 according to the first preferred embodiment of the invention. Control routine 300 starts when a key is turned, as in step 310, to start engine 12. Controller 35 then switches valve 80 to the position shown in FIG. 2 while engine thermostat 50 is closed to place system 30 in the automatic transmission fluid heater priority mode. Also, controller 35 calculates settings for first and second timers T1, T2 at step 312 as discussed more fully with respect to FIGS. 15 and 16. While the graphs of FIGS. 15 and 16 show settings for timers T1 and T2 being set by measured engine coolant temperature, the settings for timers T1 and T2 are optionally set by any measured temperature indicative of the automatic transmission fluid when engine 12 is started that constitutes the starting temperature as discussed more fully above. Loop 315 simply represents a logical flow node. Controller 35 keeps valve 80 activated until one of four events occurs. At step 320 the engine coolant temperature is measured and if the engine coolant temperature is not greater than a threshold of preheat 190 degrees Fahrenheit (88° C.) control routine 300 continues. At step 325, the transmission fluid's temperature in the sump is checked, and if the temperature is not above 200 degrees Fahrenheit (93° C.), control routine 300 continues. At step 330, timer T1 is checked. If timer T1 is not on at step 330, then the rate of change of the transmission temperature is checked at 332. If the rate of change is less than a rate threshold of preferably one degree Fahrenheit (5/9° C.), per minute, then the timer is set at step 334. While timer T1 is running at step 336, the routine continues. At step 340, timer T2 is checked. If timer T2 is not running at step 340, then control lever 25 is checked to determine if transmission 18 is in park. If transmission 18 is moved from park into reverse, drive or any other position, then timer T2 is set. While timer T2 is running, control routine 300 continues. If the engine coolant temperature drops below 190 degrees Fahrenheit (88° C.), or the temperature of the automatic transmission fluid in the sump drops below 200 degrees Fahrenheit (93° C.), or either timer T1, T2 runs out, then control routine 300 switches valve 80 at step 350 and at step 360 the automatic transmission fluid regulation mode is entered. While the listed temperatures are preferable, other temperatures may be used in step 320 and 325 to determine when the control routine enters step 350. For example, a lower temperature of 160 degrees Fahrenheit (71° C.) may be used in step 320. Preferably, the temperature setting in step 320 should be below a setting present for thermostat 50 to ensure proper operation of routine 300.

FIG. 15 is a graph 370 showing a first timer setting 372 verses the starting temperature, in this case engine coolant temperature (ECT) 374 at engine start up. At very cold engine coolant temperatures below a low temperature set point, preferably 0 degrees Fahrenheit (−18° C.), the timer T1 is set to a high timer value, preferably 10 minutes, as shown by line 376. Between the low temperature set point and a high temperature set point, preferably 0 (−18° C.), and 15 degrees Fahrenheit (−9° C.) respectively, timer T1 setting changes as shown by line 377 as a variable timer value, preferably between 10 and 0 minutes. Intermediate points on the graph are preferably derived by interpolation. Above the high temperature set point, timer T1 is set to a low timer value, preferably 0 minutes as shown by line 378. Alternatively, more set points are used to define the relationship between timer T1 and the starting temperature.

FIG. 16 is a graph 380 showing a second timer setting 382 verses the starting temperature, in this case engine coolant temperature (ECT) 384 at engine start up. At very cold engine coolant temperatures in a low variable temperature range, preferably between −40 and 0 degrees Fahrenheit (−18° C. and −4° C.), timer T2 is set within a high variable time range as shown by line 386. The high variable time range is preferably between 45-30 minutes. When the temperature is in an intermediate temperature range, preferably between 0 and 20 degrees Fahrenheit (−18° C. and −9° C.), timer T2 is set to a variable amount as shown by line 387. Again, in an intermediate variable time range, preferably between 30 to 0 minutes, intermediate points on the graph are derived by interpolation. Above a high value temperature set point, preferably 20 degrees Fahrenheit (−7° C.), timer T2 is set to a low timer set point, preferably 0 degrees Fahrenheit (−18° C.) as shown by line 388. Alternatively, more set points are used to define the relationship between timer T2 setting and starting temperature.

Figure 17:
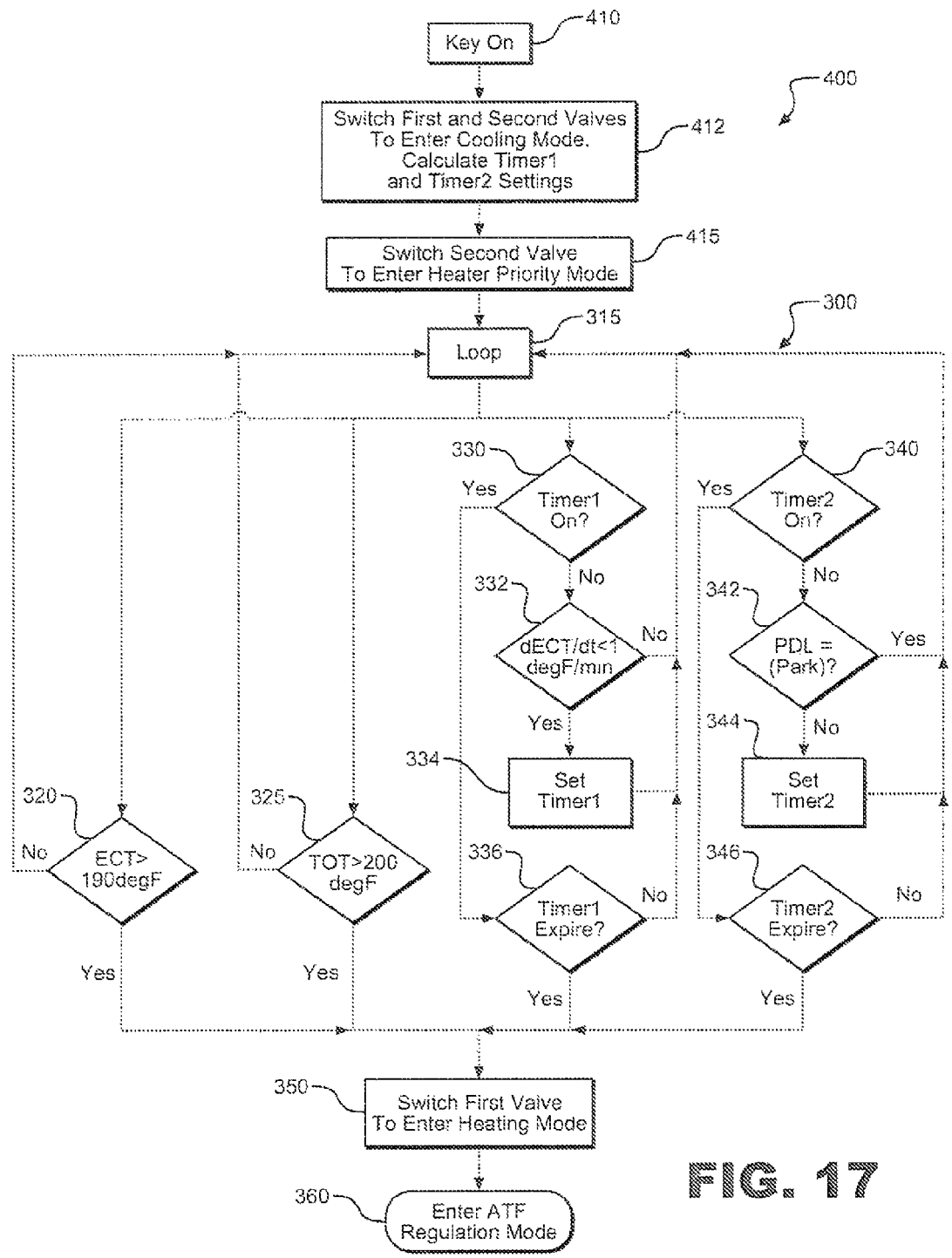
FIG. 17 is a flowchart showing a control routine employed according to the second, third and fourth preferred embodiments of the invention.

FIG. 17 is a flowchart showing a control routine 400 employed in systems 130, 230 and 330 according to the second, third and fourth preferred embodiments of the invention. Control routine 400 starts when a key is turned as in step 410 to start engine 12. At step 412, first valve 80, 280 and second valve 190, 290 are switched to the position shown in FIGS. 7, 10 and 13 so that systems 130, 230, and 330 enter the automatic transmission-cooling mode. Also, controller 35 calculates settings for first and second timers T1, T2 at step 412 based on one of the initial starting temperature of the engine coolant, ambient air or automatic transmission fluid. Preferably, less than two seconds later, control routine 400 then proceeds to step 415 and switches second valve 190, 290. At this point, systems 130, 230, and 330 are in the heater priority mode wherein no engine coolant flow is passing through heat exchanger 70. Control routine 400 then essentially incorporates all the steps of control routine 300 of FIG. 10 and therefore the description of routine 300 will not be repeated. Control routine 400 will then switch first valve 80, 280 if any one of the four conditions described above occur to enter the heating mode. Preferably, second valve 190, 290 will also switch.

Figure 18:
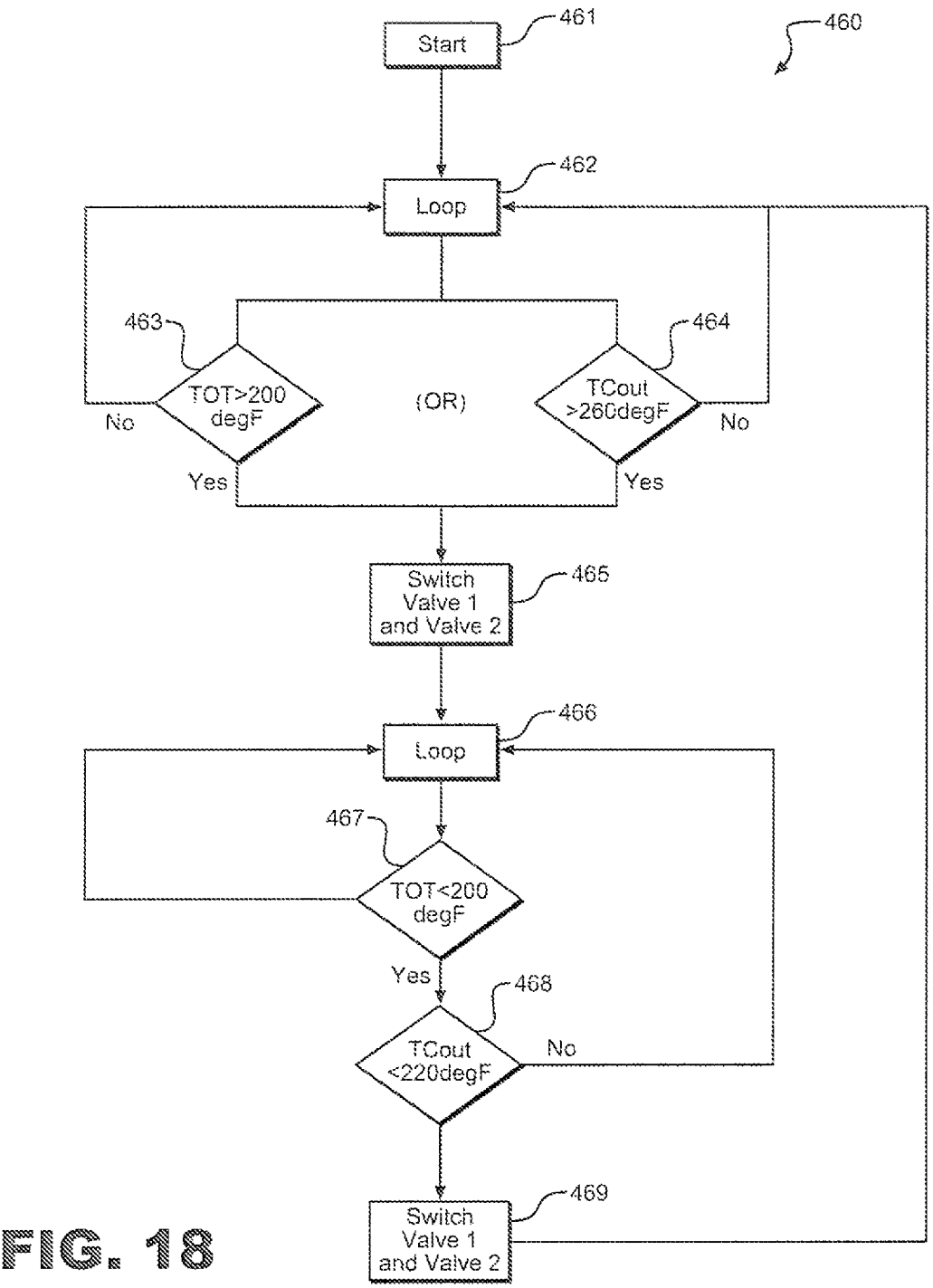
FIG. 18 is a flowchart showing details of the automatic fluid transmission temperature control routine of FIG. 13 that applies to all four preferred embodiments.

After control routine 300 has completed, control routine 400 enters automatic transmission fluid regulation mode at step 460 as can best be seen in FIG. 18. Systems 130, 230 and 330 are in automatic transmission warming mode when first entering step 461 and then the routine proceeds to loop 462. Preferably, systems 130, 230 and 330 switch to automatic transmission cooling mode if either of the following two conditions are met, i.e., sump temperature exceeds a set value, preferably 220 degrees Fahrenheit (104° C.) as seen at step 463, or transmission case output temperature exceeds a set value, preferably 260 degrees Fahrenheit (127° C.) as seen at step 464. Essentially, these conditions indicate that the automatic transmission fluid needs cooling, thus first and second valve are switched to enter the cooling mode as shown at step 465. Of course, it is possible that these conditions may not be met when transmission 18 is subject to a light duty cycle. Systems 130, 230 and 330 then switch back to automatic transmission heating mode as shown in steps 466, 467, 468 and 469 if both the following conditions are met, i.e., sump temperature drops below a set value (TOT), preferably 200 degrees Fahrenheit (93° C.) as shown in step 467, and transmission case out temperature drops below a set value, preferably 220 degrees Fahrenheit (104° C.) as shown in step 468. At step 469, systems 130, 230 and 330 then proceed to switch back and forth between the warming mode and the cooling mode based on the same criteria as shown by loops 462 and 466. While described with respect to systems 130, 230 and 330 of FIGS. 5-13, the automatic transmission temperature regulation is also employed by the first preferred embodiment by switching valve 80 between the warming mode of FIG. 3 to the cooling mode of FIG. 4 based on the temperature criteria described above.

Each of the four preferred embodiments provides a system for heating and cooling automatic transmission fluid in a rapid and efficient manner thereby reducing the transmission fluid's viscosity and cooling the transmission fluid when the transmission is subjected to heavy loads. Although described with reference to preferred embodiments of the invention, it should be readily understood that various changes and/or modifications can be made to the invention without departing from the spirit thereof. For example, the optional preheating supply line 78 shown in FIGS. 2-4 could be used in any of the embodiments shown in FIGS. 5-13. In general, the invention is only intended to be limited by the scope of the following claims.

The invention claimed is:

1. A method for controlling a temperature of transmission fluid in a motor vehicle having an engine and a transmission comprising:
   operating in a heater priority mode by disabling automatic transmission fluid heating;
   determining when to enter an automatic transmission fluid heating mode by determining when any one of a group of conditions has been met, wherein determining when any one of the group of conditions has been met includes determining if a first condition is met by detecting an expiration of a first timer and wherein entering an automatic transmission fluid heating mode occurs after the heater priority mode and only when any one of the group of conditions has been met; and
   entering the automatic transmission fluid heating mode by sending hot engine coolant to a heat exchanger for heating the automatic transmission fluid by transferring heat from the hot engine coolant to the automatic transmission fluid.

2. The method according to claim 1 wherein determining when any one of the group of conditions has been met includes determining if a second condition is met by measuring an engine coolant temperature and determining if the measured engine coolant temperature is above a coolant temperature set point.

3. The method according to claim 1 wherein determining when any one of the group of conditions has been met includes determining if a second condition is met by measuring an automatic transmission fluid temperature and determining if the measured automatic transmission fluid temperature is above an automatic transmission fluid temperature set point.

4. The method according to claim 1 further comprising operating in an automatic transmission fluid cooling mode by sending cold engine coolant to the heat exchanger for cooling the automatic transmission fluid by transferring heat from the automatic transmission fluid to the cold engine coolant, wherein entering the automatic transmission fluid cooling mode includes switching a first valve to send the cold engine coolant leaving a radiator to the heat exchanger.

5. The method according to claim 1 wherein determining when any one of the group of conditions has been met includes determining if a second condition is met by detecting an expiration of a second timer.

6. The method according to claim 1 wherein detecting the expiration of the first timer to indicate that the first condition has been met further includes:
   determining if a rate of change of an engine coolant temperature exceeds a rate threshold and setting the first timer to a first time value based on a starting temperature if the rate of change of the engine coolant temperature exceeds the rate threshold.

7. The method according to claim 6 wherein the first time value is:
   set to a high timer value if the starting temperature is below a low temperature set point;
   set to a variable timer value if the starting temperature is between the low temperature set point and a high temperature set point; and
   set to a low timer value if the starting temperature is above the high temperature set point.

8. The method according to claim 6 wherein the starting temperature is determined by measuring one of a transmission fluid temperature, an ambient air temperature and an engine coolant temperature when the engine is started.

9. The method according to claim 7 wherein the high timer value is 10 minutes and the low temperature set point is zero degrees Fahrenheit (−18° C.).

10. The method according to claim 7 wherein the variable timer value varies between 10 to 0 minutes as a linear function of the starting temperature and the high temperature set point is 15 degrees Fahrenheit (−9° C.).

11. The method according to claim 7 wherein the low timer value is zero minutes.

12. The method according to claim 5 wherein determining if the second condition is met by determining if the second timer has expired further includes:
determining if a transmission control lever is in a park position and setting the second timer to a second time value based on a starting temperature if the lever is not in the park position.

13. The method according to claim 12 wherein the second time value is:
set as a linear function of the starting temperature in a high timer range if the starting temperature is in a low temperature range;
set as a linear function of the starting temperature in an intermediate timer range if an engine coolant temperature is in an intermediate temperature range; and
set to a low timer value if the starting temperature is above the intermediate temperature range.

14. The method according to claim 13 wherein the high timer range is 45 to 30 minutes and the low temperature range is −40 to zero degrees Fahrenheit (−18° C. to −4° C.).

15. The method according to claim 13 wherein the intermediate timer range is 30 to zero minutes and the intermediate temperature range is 0 to 20 degrees Fahrenheit (−18° C. to −9° C.).

16. The method according to claim 13 wherein the low timer value is zero minutes.

17. The method according to claim 1 wherein entering the automatic transmission fluid heating mode includes switching a first valve to send the hot engine coolant directly to the heat exchanger and switching a second valve to send the hot engine coolant leaving a radiator back to the engine.

18. The method according to claim 1 further comprising regulating the temperature of transmission fluid in a motor vehicle transmission by:
directing hot engine coolant from an engine to a heat exchanger;
entering the heating mode by heating the automatic transmission fluid by transferring heat from the hot engine coolant to the automatic transmission fluid by using the heat exchanger;
directing cold engine coolant from a radiator to the heat exchanger;
entering a cooling mode by cooling the automatic transmission fluid by transferring heat from the automatic transmission fluid to the cold engine coolant by using the heat exchanger;
measuring a sump temperature of the automatic transmission fluid in the sump of the automatic transmission;
measuring a case out temperature of the automatic transmission fluid as the automatic transmission fluid leaves the automatic transmission;
entering the cooling mode when the sump temperature exceeds a first high set value or the case out temperature exceeds a second high set value; and
entering the heating mode when either the sump temperature drops below a first low set value and the case out temperature drops below a second low set value.

19. A method for controlling a temperature of transmission fluid in a motor vehicle having an engine and a transmission comprising:
operating in a heater priority mode by disabling automatic transmission fluid heating;
operating in an automatic transmission fluid cooling mode by sending cold engine coolant to the heat exchanger for cooling the automatic transmission fluid by transferring heat from the automatic transmission fluid to the cold engine coolant, wherein entering the automatic transmission fluid cooling mode includes switching a first valve to block the hot engine coolant from passing directly to the heat exchanger and switching a second valve to send the cold engine coolant leaving a radiator to the heat exchanger;
determining when to enter an automatic transmission fluid heating mode by determining when any one of a group of conditions has been met wherein entering an automatic transmission fluid heating mode occurs after the heater priority mode and only when any one of the group of conditions has been met; and
entering the automatic transmission fluid heating mode by sending hot engine coolant to a heat exchanger for heating the automatic transmission fluid by transferring heat from the hot engine coolant to the automatic transmission fluid.

20. The method of claim 19 wherein the first low set value is 200 degrees Fahrenheit (93° C.) and the second low set value is 220 degrees Fahrenheit (104° C.).

21. A method for controlling a temperature of transmission fluid in a motor vehicle having an engine and a transmission comprising:
operating in a heater priority mode by disabling automatic transmission fluid heating wherein entering the heater priority mode includes switching a first valve to send the hot engine coolant directly to a heater core and switching a second valve to send cold engine coolant leaving a radiator back to the engine;
determining when to enter an automatic transmission fluid heating mode by determining when any one of a group of conditions has been met wherein entering an automatic transmission fluid heating mode occurs after the heater priority mode and only when any one of the group of conditions has been met; and
entering the automatic transmission fluid heating mode by sending hot engine coolant to a heat exchanger for heating the automatic transmission fluid by transferring heat from the hot engine coolant to the automatic transmission fluid.

22. The method of claim 19 wherein the first high set value is 220 degrees Fahrenheit (104° C.) and the second high set value is 260 degrees Fahrenheit (127° C.).

* * * * *